United States Patent
Tanikawa (10) Patent No.: US 12,512,153 B2
(45) Date of Patent: Dec. 30, 2025

(54) SEMICONDUCTOR DEVICE AND SEMICONDUCTOR MEMORY DEVICE

(71) Applicant: LAPIS Technology Co., Ltd., Yokohama (JP)

(72) Inventor: Hiroyuki Tanikawa, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 456 days.

(21) Appl. No.: 18/150,164

(22) Filed: Jan. 4, 2023

(65) Prior Publication Data
US 2023/0215497 A1    Jul. 6, 2023

(30) Foreign Application Priority Data

Jan. 6, 2022    (JP) .................................. 2022-001304

(51) Int. Cl.
*G11C 5/14*    (2006.01)
*G11C 11/40*    (2006.01)
*G11C 11/56*    (2006.01)
*H10B 12/00*    (2023.01)

(52) U.S. Cl.
CPC .............. *G11C 11/56* (2013.01); *G11C 11/40* (2013.01); *H10B 12/30* (2023.02)

(58) Field of Classification Search
CPC .......... G11C 11/56; G11C 11/40; H10B 12/30
USPC ..................................................... 365/189.09
See application file for complete search history.

(56) References Cited

U.S. PATENT DOCUMENTS

| | | | | |
|---|---|---|---|---|
| 6,982,899 B2 * | 1/2006 | Sumitani | ............... | G11C 11/419 365/230.06 |
| 7,016,232 B2 * | 3/2006 | Lee | ......................... | G11C 7/062 365/185.11 |
| 7,738,281 B2 * | 6/2010 | Iida | ...................... | G11C 11/4094 365/230.08 |
| 9,029,866 B2 * | 5/2015 | Roberts | .............. | H10D 30/4755 257/E29.112 |
| 9,508,797 B2 * | 11/2016 | Roberts | ................ | H10D 64/258 |
| 10,692,951 B2 * | 6/2020 | Song | ..................... | H10K 59/126 |
| 12,015,061 B2 * | 6/2024 | Lim | ...................... | H10D 64/257 |

FOREIGN PATENT DOCUMENTS

JP      2009087987      4/2009

* cited by examiner

*Primary Examiner* — Viet Q Nguyen
(74) *Attorney, Agent, or Firm* — JCIPRNET (57) ABSTRACT

In a semiconductor device 100, at least one of a first transistor and a second transistor that supply a second voltage in a step-down circuit stepping down a first voltage to the second voltage and outputting the second voltage from an output portion is configured such that the number of second contacts of a source electrode which is connected to a ground voltage or is supplied with the first voltage is larger than the number of first contacts connecting a diffusion layer and a first metal layer of a drain electrode connected to the output portion, and the number of second vias of the source electrode connected to the ground voltage or supplied with the first voltage is larger than the number of first vias connecting the first metal layer and a second metal layer of the drain electrode connected to the output portion.

16 Claims, 8 Drawing Sheets

SEMICONDUCTOR DEVICE AND SEMICONDUCTOR MEMORY DEVICE

CROSS-REFERENCE TO RELATED APPLICATION

This application claims priority under 35 USC 119 from Japanese Patent application No. 2022-001304 filed on Jan. 6, 2022, the disclosure of which is incorporated by reference herein.

BACKGROUND

Technical Field

The disclosure relates to a semiconductor device and a semiconductor memory device.

Description of Related Art

Miniaturization of semiconductor devices has progressed, and a source voltage of internal circuits of a semiconductor device needs to be lowered. On the other hand, an external source voltage that is supplied to the semiconductor device may be a high voltage as in the related art to maintain compatibility with existing specifications. Therefore, in consideration of a case in which an external source voltage is input as a high voltage, a regulator for stepping down a high voltage to a low voltage is incorporated into a semiconductor device, and an output voltage of the regulator is supplied to internal circuits. For example, Patent Document 1 discloses a step-down circuit that steps down an external source voltage to a source voltage required for the inside of a chip in a semiconductor device.

For example, in a dynamic random access memory (DRAM), a step-down circuit including a driver is generally used for defining an amount of signal charge of a memory capacitor, stepping down an external source voltage to an internal operating voltage as a data line voltage at the time of precharging, and additionally stepping down the voltage to ½.

PATENT DOCUMENTS

[Patent Document 1] Japanese Patent Laid-open No. 2009-87987

However, as process miniaturization has progressed, a current has not been able to be sufficiently drawn out from the step-down circuit, a voltage has not been stepped down, and an output voltage has exceeded a prescribed voltage. The reason why a current cannot be sufficiently drawn out is that a threshold value of a driver for drawing out a current is high, and improvement in current drawing-out cannot be obtained even when a gate width of the driver is increased.

The disclosure was invented in consideration of the aforementioned circumstances and provides a semiconductor device and a semiconductor memory device that can step down a voltage to a desired voltage.

SUMMARY

According to a first aspect of the disclosure, there is provided a semiconductor device, wherein at least one of a first transistor and a second transistor that supply a second voltage in a step-down circuit stepping down a first voltage to the second voltage and outputting the second voltage from an output portion is provided such that the number of second contacts of a source electrode which is connected to a ground voltage or is supplied with the first voltage is larger than the number of first contacts connecting a diffusion layer and a first metal layer of a drain electrode connected to the output portion and the number of second vias of the source electrode connected to the ground voltage or supplied with the first voltage is larger than the number of first vias connecting the first metal layer and a second metal layer of the drain electrode connected to the output portion.

According to a second aspect of the disclosure, there is provided a semiconductor memory device including: the semiconductor device according to any one of the first to fifth aspects; and a memory cell that is electrically connected to the semiconductor device.

According to the disclosure, it is possible to provide a semiconductor device and a semiconductor memory device that can step down a voltage to a desired voltage.

DESCRIPTION OF THE EMBODIMENTS

Hereinafter, examples of an embodiment of the disclosure will be described with reference to the accompanying drawings. In the drawings, the same or equivalent elements and parts will be referred to by the same reference signs, and dimensional proportions of the drawings are exaggerated for the purpose of convenient description and may be different from real proportions.

Figure 1:
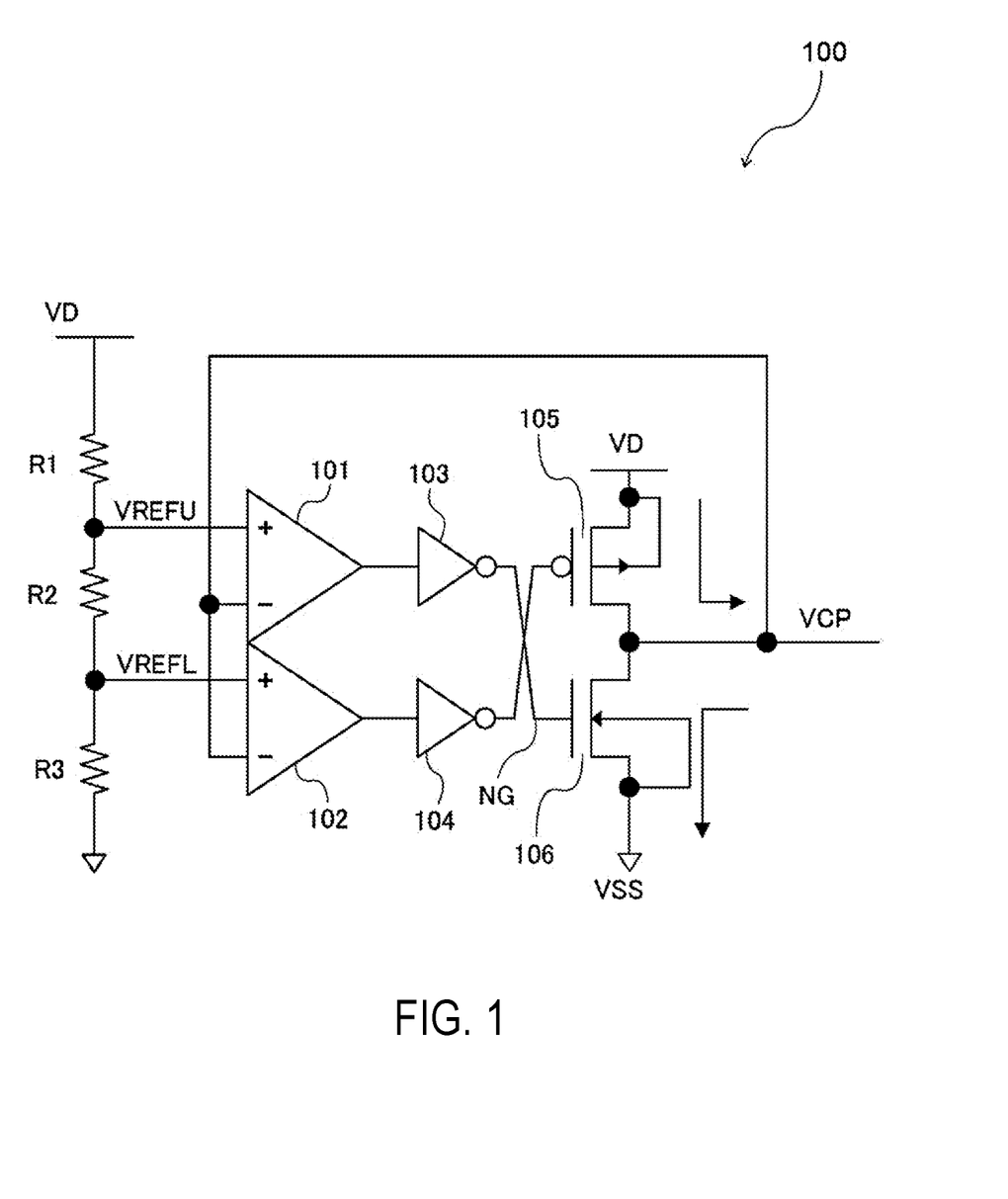
FIG. 1 is a diagram illustrating a circuit configuration of a semiconductor device according to an embodiment.

FIG. 1 is a diagram illustrating a circuit configuration of a semiconductor device according to an embodiment.

A semiconductor device 100 illustrated in FIG. 1 includes resistors R1, R2, and R3 which are connected in series, comparators 101 and 102, inverters 103 and 104, and drivers 105 and 106. The driver 105 is a PMOS transistor, and the driver 106 is an NMOS transistor.

The resistors R1, R2, and R3 are provided to divide an internal operating voltage VD. The comparator 101 compares a voltage VREFU obtained by dividing the internal operating voltage VD using the resistor R1 and the resistors R2 and R3 with an output voltage VCP of the semiconductor device 100 and outputs a signal for turning on the NMOS transistor of the driver 106 when the output voltage VCP is higher. The comparator 102 compares a voltage VREFL obtained by dividing the internal operating voltage VD using the resistors R1 and R2 and the resistor R3 with the output voltage VCP of the semiconductor device 100 and outputs a signal for turning on the PMOS transistor of the driver 105 when the output voltage VCP is lower. The voltage VREFU is VD/2+ΔV, and the voltage VREFL is VD/2−ΔV.

The driver 106 includes an NMOS transistor and compares the voltage VREFU with the output voltage VCP of the semiconductor device 100. When the output voltage VCP is higher, the NMOS transistor is turned on according to an output of the comparator 101. When the NMOS transistor of the driver 106 is turned on, a current is drawn out from the output of the semiconductor device 100 to lower the output voltage VCP.

The driver 105 includes a PMOS transistor and compares the voltage VREFL with the output voltage VCP of the semiconductor device 100. When the output voltage VCP is lower, the PMOS transistor is turned on according to an output of the comparator 102. When the PMOS transistor of the driver 105 is turned on, a current is caused to flow into the output of the semiconductor device 100 to raise the output voltage VCP.

The semiconductor device 100 according to the embodiment can be controlled such that the output voltage VCP does not exceed VD/2+ΔV by enhancing current drawing-out performance of the driver 106. A structural example of the NMOS transistor of the driver 106 will be described below.

Figure 2:
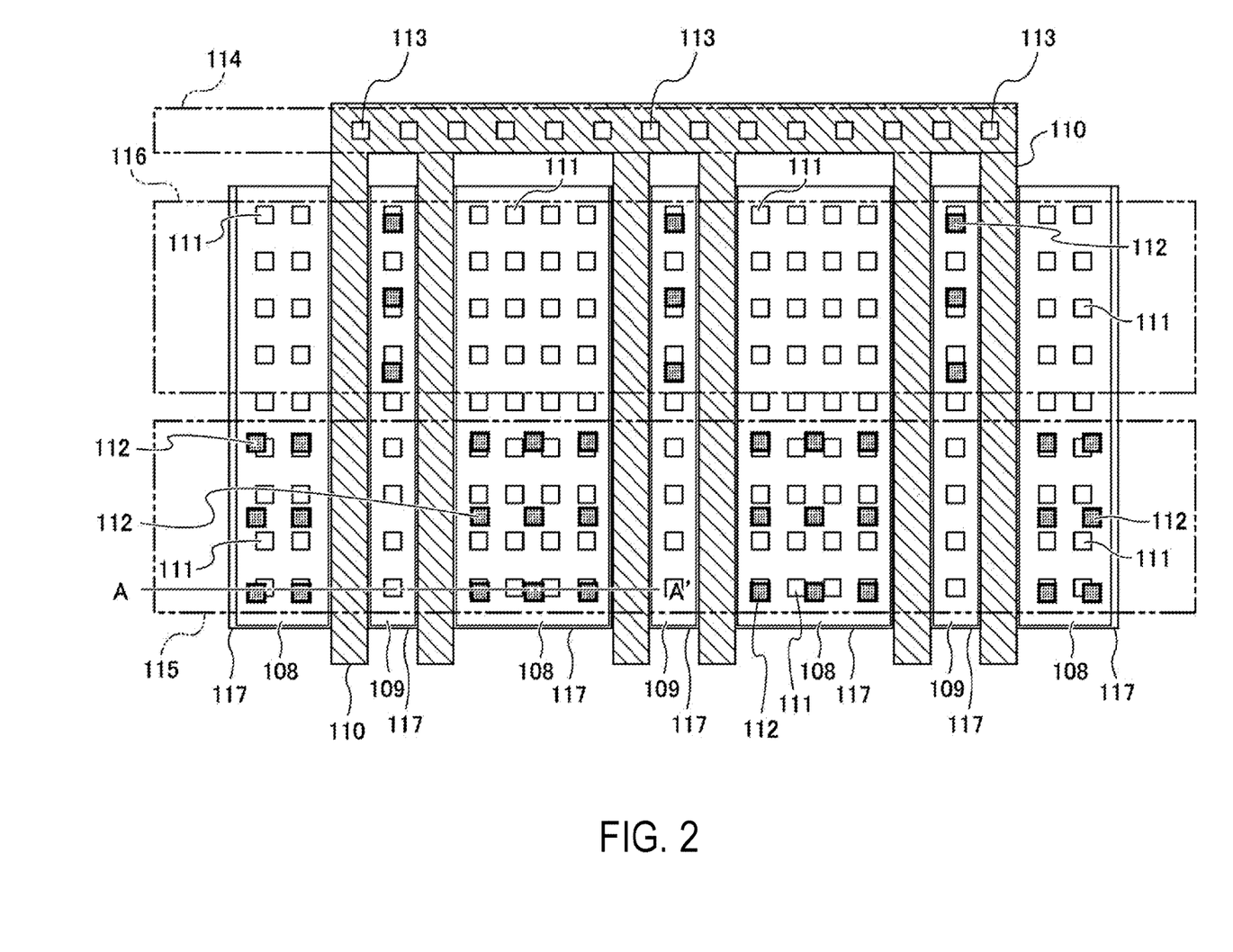
FIG. 2 is a plan view of an NMOS transistor of a driver according to the embodiment.
Figure 3:
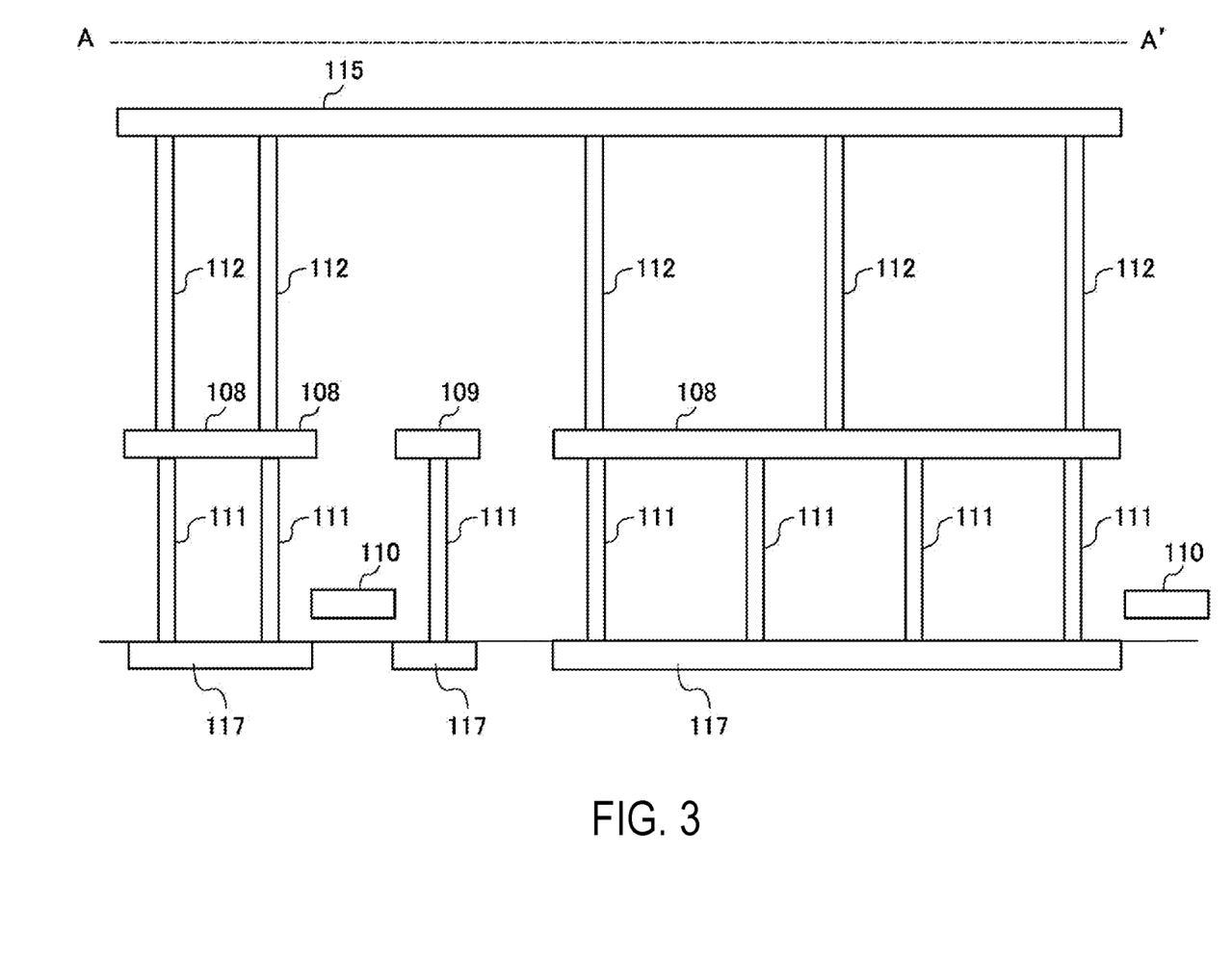
FIG. 3 is a sectional view of the NMOS transistor of the driver according to the embodiment along line A-A' in FIG. 2.

(First example) A first example of the NMOS transistor of the driver 106 according to the embodiment will be first described below. FIG. 2 is a plan view of the NMOS transistor of the driver 106 according to the embodiment. FIG. 3 is a sectional view of the NMOS transistor of the driver 106 according to the embodiment along line A-A' in FIG. 2.

As illustrated in FIGS. 2 and 3, the NMOS transistor of the driver 106 according to the first example includes an interconnection M1 layer 108 of a source electrode, an interconnection M1 layer 109 of a drain electrode, a polysilicon layer 110 of an NG node illustrated in FIG. 1, a contact 111, a via 112, a contact 113 of the NG node, an interconnection M1 layer 114 of the NG node, an interconnection M2 layer 115 of a VSS node, an interconnection M2 layer 116 of a VCP node, and an N+ diffusion layer 117.

In the driver 106 according to the embodiment, a source voltage VD, a ground voltage VSS, and an output voltage VCP are wired on an MOS driver to curb a circuit area. In FIG. 2, a guard ring region and a guard band region of the NMOS transistor of the driver 106 which are present nearby and which are supplied with a substrate voltage are not illustrated. The guard ring region and the guard band region are also not illustrated in the other drawings.

In a region in which the interconnection M2 layer 115 of the VSS node is formed in the NMOS transistor of the driver 106 illustrated in FIGS. 2 and 3, the number of contacts 111 (hereinafter also referred to as second contacts) connected to an interconnection M2 layer 115 of the VSS node is set to be larger than the number of contacts 111 (hereinafter also referred to as first contacts) connecting the N+ diffusion layer 117 of the drain electrode connected to an interconnection M2 layer 116 of the VCP node and the interconnection M1 layer 109 of the drain electrode. In the NMOS transistor of the driver 106 according to the first example, the number of vias 112 (hereinafter also referred to as second vias) connecting the interconnection M1 layer 109 of the drain electrode connected to the VSS node and the interconnection M2 layer 115 of the VSS node is set to be larger than the number of vias 112 (hereinafter also referred to as first vias) connecting the interconnection M1 layer 109 of the drain electrode connected to the VCP node and the interconnection M2 layer 116 of the VCP node.

For example, the number of second contacts may be equal to or greater than two times the number of first contacts. For example, the number of second vias may be equal to or greater than two times the number of first vias. The numbers of vias and the numbers of contacts are appropriately selected according to a circuit scale.

Figure 4:
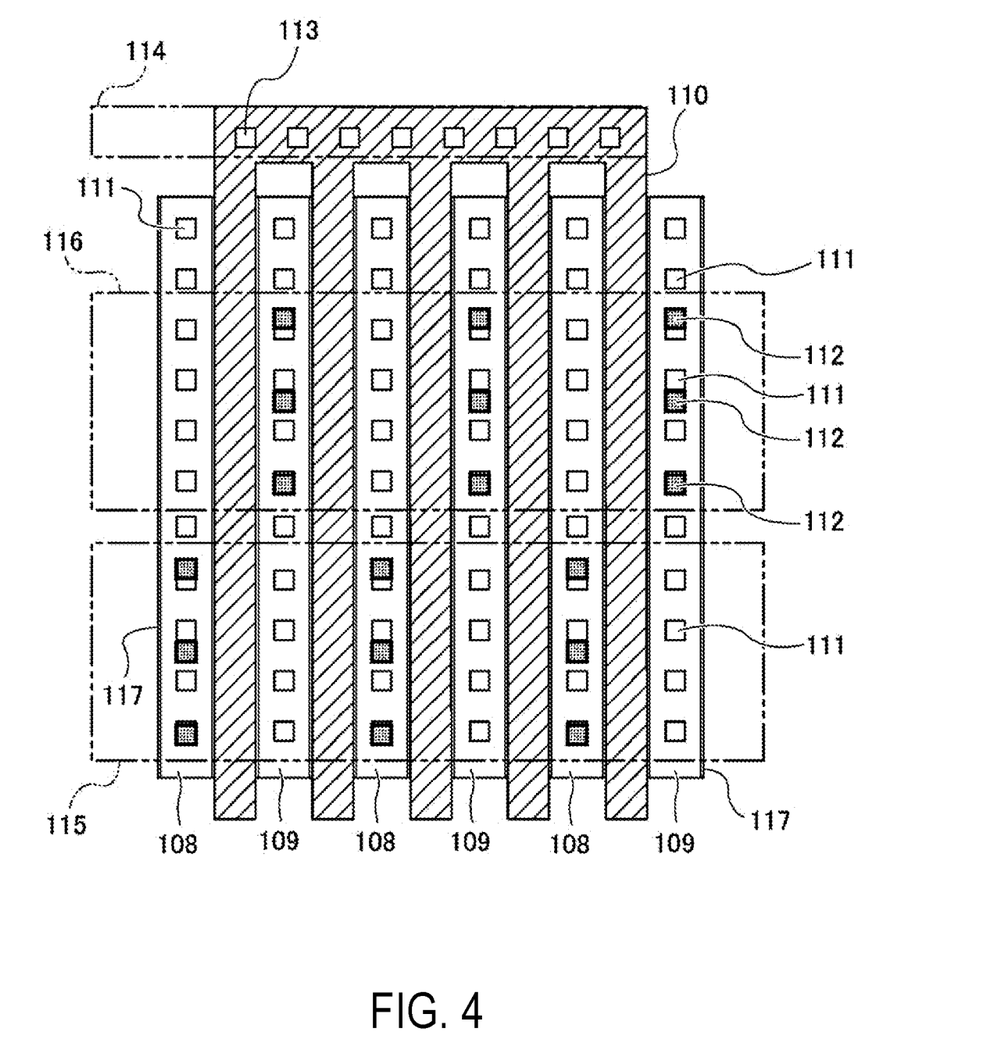
FIG. 4 is a plan view of an NMOS transistor according to a comparative example.

As a comparative example, an example in which the number of contacts 111 connecting the N+ diffusion layer 117 of the drain electrode connected to the interconnection M2 layer 116 of the VCP node and the interconnection M1 layer 109 of the drain electrode and the number of contacts 111 of the source electrode connected to the ground voltage VSS are set to be equal and the number of vias 112 connecting the interconnection M1 layer 109 of the drain electrode connected to the VCP node and the interconnection M2 layer 116 of the VCP node and the number of vias 112 connecting the interconnection M1 layer 109 of the drain electrode connected to the VSS node and the interconnection M2 layer 115 of the VSS node are set to be equal will be described.

FIG. 4 is a plan view of an NMOS transistor which is a comparative example of the NMOS transistor of the driver 106.

Like a plate line voltage or a bit line precharging voltage of a memory cell of a DRAM, a voltage of a source electrode of a diffusion layer is made to float due to resistances of the contacts 111 and the vias 112 between the interconnection M2 layer 115 and the N+ diffusion layer 117 of the source electrode in a path connected to the ground voltage VSS of an external pad when a current of several mA or larger is drawn out from the VCP node. On the other hand, since a current is not drawn out from a substrate voltage of the driver 106, the substrate voltage is not made to float and the ground voltage VSS is supplied as the substrate voltage. Accordingly, a threshold value of the NMOS transistor of the driver 106 is increased due to a substrate effect, and thus a sufficient current is not drawn out even if the gate of the driver 106 (the NG node) is amplified to the voltage VD particularly when the threshold value is originally high and the voltage VD is originally low with process miniaturization. When a sufficient current is not drawn out, there is concern of the output voltage of the VCP node exceeding VD/2+ΔV. Since this is based on an increase of the threshold value of the transistor, improvement of current drawing-out is not achieved well even if the gate width of the driver 106 is increased.

That is, in the comparative example illustrated in FIG. 4, a voltage may not be stepped down to a desired voltage due to insufficient discharging capability.

On the other hand, in the NMOS transistor of the driver 106 illustrated in FIGS. 2 and 3, resistances of the contacts 111 and the vias 112 between the interconnection M2 layer 115 of the VSS node and the N+ diffusion layer 117 of the source electrode can be decreased by providing the contacts 111 and the vias 112 as illustrated in FIG. 2. By decreasing the resistances of the contacts 111 and the vias 112, an increase of the threshold value of the NMOS transistor of the driver 106 due to the substrate effect is curbed.

Specifically, when a source diffusion layer is widened to increase the number of contacts and the number of vias two times, a contact resistance and a via resistance are decreased to a half. Even when a resistance of the diffusion layer is considered, the NMOS transistor of the driver 106 illustrated in FIGS. 2 and 3 has a resistance decrease effect at any resistance value of the diffusion layer (that is, in all processes). When the contact resistance and the via resistance are decreased, floating of the source voltage is curbed and an increase of the threshold value is curbed. Accordingly, it is possible to secure discharging capability.

Since the increase of the threshold value of the NMOS transistor of the driver 106 is curbed, it is possible to secure sufficient current drawing-out performance proportional to the gate width when a current flows into the VCP node, and it is possible to cause the output voltage of the VCP node to converge on VD/2+ΔV or less. As illustrated in FIG. 2, by using the N+ diffusion layers 117 at both ends as the source electrode, a likelihood of occurrence of latch-up can be decreased regardless of the voltage value of the output voltage VCP of the VCP node.

Figure 5:
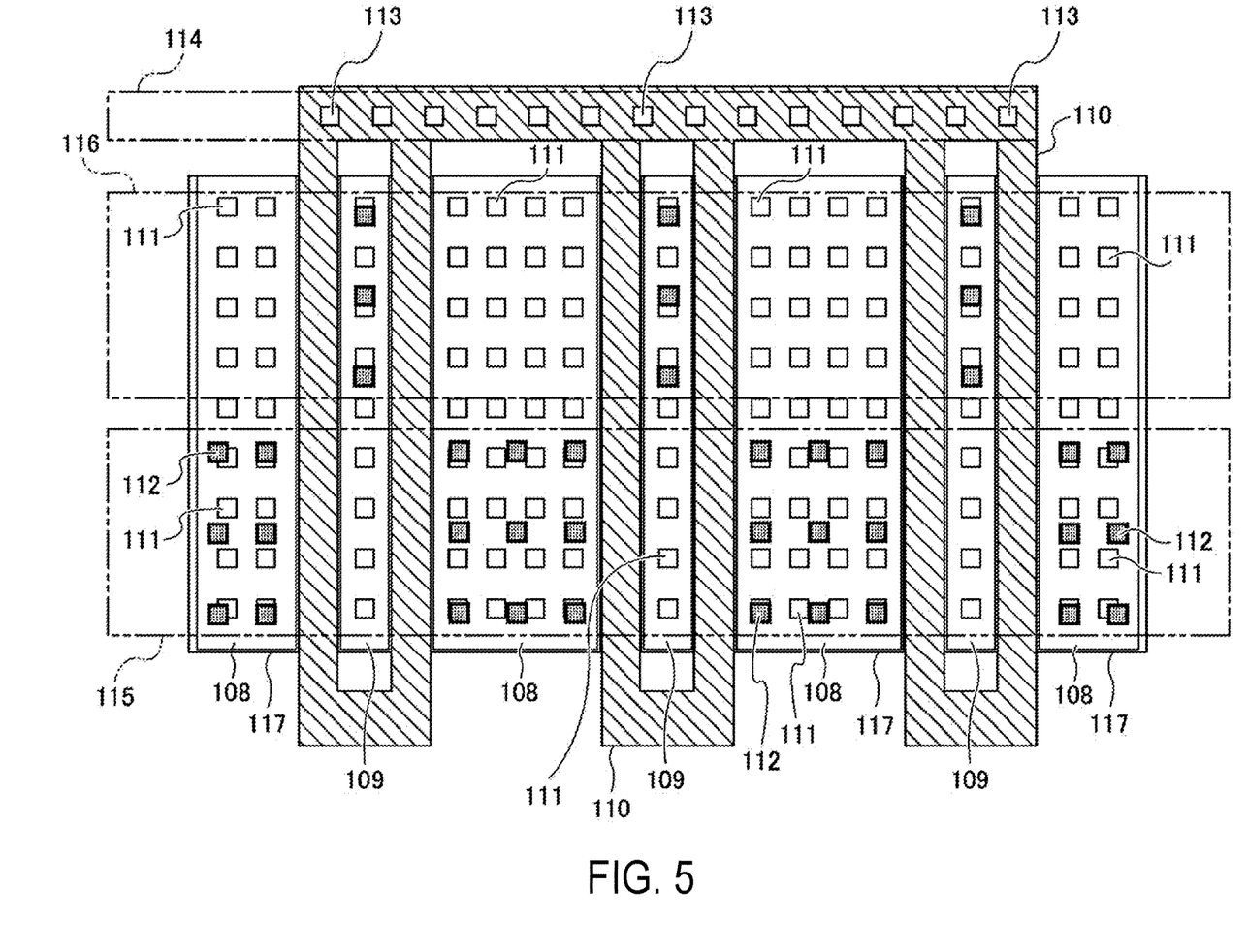
FIG. 5 is a plan view of the NMOS transistor of the driver according to the embodiment.

(Second example) A second example of the NMOS transistor of the driver 106 according to the embodiment will be described below. FIG. 5 is a plan view of the NMOS transistor of the driver 106 according to the embodiment.

The NMOS transistor illustrated in FIG. 5 is different in layout from the NMOS transistor illustrated in FIG. 2, in that a polysilicon layer 110 of the NG node is additionally interconnected in an element isolation region to surround the N+ diffusion layer 117 of the drain electrode.

When a step-down circuit is not used and the output voltage VCP of the VCP node is fixed to a voltage of certain specifications such as the VD other than the ground voltage VSS, a field leakage current is generated in the NMOS transistor of the driver 106 due to a potential difference between the source electrode and the drain electrode. In the first example, when the size of the source electrode increases, the field leakage current increases. On the other hand, in the second example, the field leakage current can be removed by applying the ground voltage VSS to the polysilicon layer 110.

Figure 6:
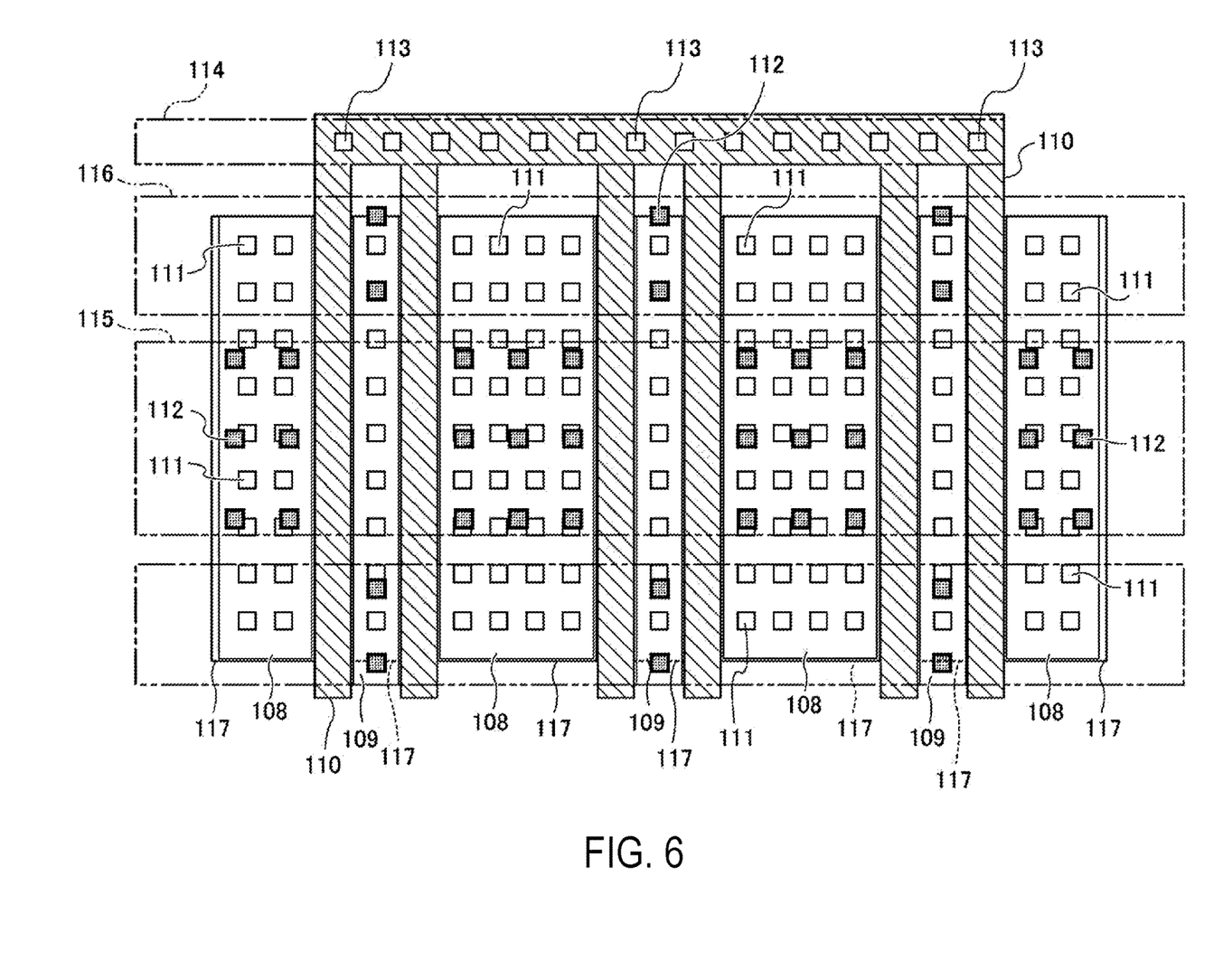
FIG. 6 is a plan view of the NMOS transistor of the driver according to the embodiment.

(Third example) A third example of the NMOS transistor of the driver 106 according to the embodiment will be described below. FIG. 6 is a plan view of the NMOS transistor of the driver 106 according to the embodiment.

The NMOS transistor illustrated in FIG. 6 is different in layout from the NMOS transistor illustrated in FIG. 2, in that the interconnection M2 layer 115 of the VSS node in a path for connection to the ground voltage VSS of an external pad is arranged perpendicular to the gate width direction in the vicinity of the center of the polysilicon layer 110 of the NG node, and the interconnection M2 layer 116 of the VCP node is arranged on both sides of the interconnection M2 layer 115 of the VSS node.

In the first example illustrated in FIG. 2, current concentration on the vias 112 of the interconnection M2 layer 115 of the VSS node on the interconnection M2 layer 116 side of the VCP node occurs. When current concentration on the vias 112 of the interconnection M2 layer 115 of the VSS node occurs, a degree of floating of a voltage in the N+ diffusion layer 117 of the source electrode under the interconnection M2 layer 116 of the VCP node is large, and a threshold value of the MOS transistor in a region under the interconnection M2 layer 116 of the VCP node is larger than a threshold value of the MOS transistor in other regions.

In the third example, a distance from the via 112 on the interconnection M2 layer 116 side of the VCP node to an end of the N+ diffusion layer 117 of the source electrode is set to be smaller than that in the first example. By decreasing the distance from the via 112 on the interconnection M2 layer 116 side of the VCP node to the end of the N+ diffusion layer 117 of the source electrode, it is possible to relax current concentration on the via 112 on the interconnection M2 layer 116 side of the VCP node. Accordingly, with the same number of contacts and the same number of vias, it is possible to further curb an increase of the threshold value of the NMOS transistor of the driver 106 in comparison with in the first example.

Figure 7:
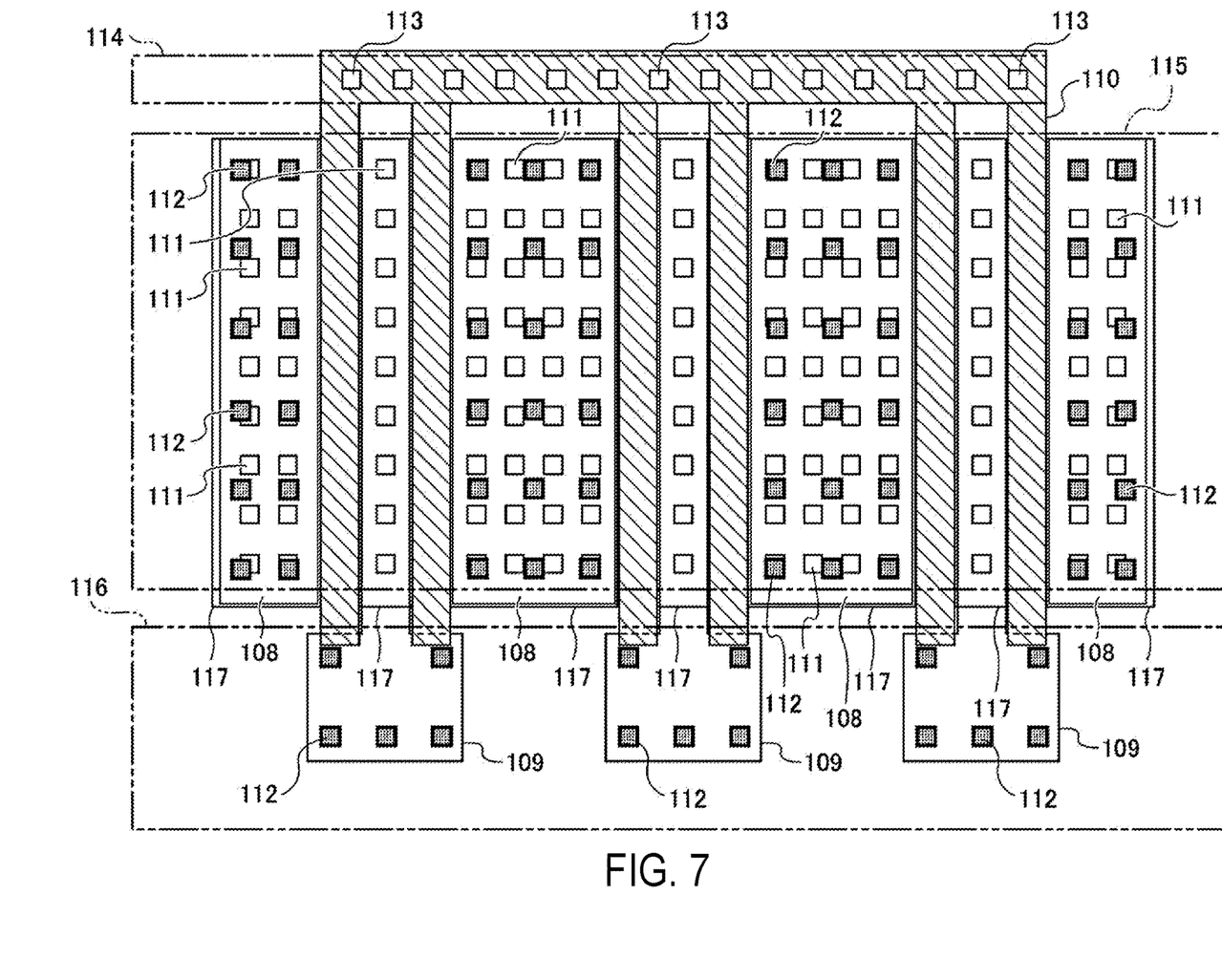
FIG. 7 is a plan view of the NMOS transistor of the driver according to the embodiment.

(Fourth example) A fourth example of the NMOS transistor of the driver 106 according to the embodiment will be described below. FIG. 7 is a plan view of the NMOS transistor of the driver 106 according to the embodiment.

The NMOS transistor illustrated in FIG. 7 is different in layout from the NMOS transistor illustrated in FIG. 2, in that the interconnection M2 layer 115 of the VSS node is arranged over the N+ diffusion layer 117. The NMOS transistor illustrated in FIG. 7 is also different in layout from the NMOS transistor illustrated in FIG. 2 in that the interconnection M2 layer 116 of the VCP node is drawn from the interconnection M1 layer 109 of the VCP node and is arranged over an element isolation region.

In the fourth example, it is possible to increase the number of vias 112 of the interconnection M2 layer 115 of the VSS node and to allow a current to flow uniformly into the vias 112. By allowing a current to flow uniformly into the vias 112 of which the number has increased, it is possible to curb floating of the voltage of the N+ diffusion layer 117 of the source electrode. Accordingly, in the fourth example, it is possible to curb an increase of the threshold value of the NMOS transistor of the driver 106 due to the substrate effect and to secure sufficient current drawing-out performance proportional to the gate width when a current flows into the VCP node.

In the aforementioned examples, the NMOS transistor of the driver 106 has been described above, and the same configurations can be applied to the PMOS transistor of the driver 105. The configurations of the transistors in the aforementioned examples can be applied to an NMOS transistor and a PMOS transistor of a driver unit of a circuit for steeping down a voltage to an arbitrary voltage in a semiconductor device that steps down the voltage from VD to VD/2 as illustrated in FIG. 1.

Figure 8:
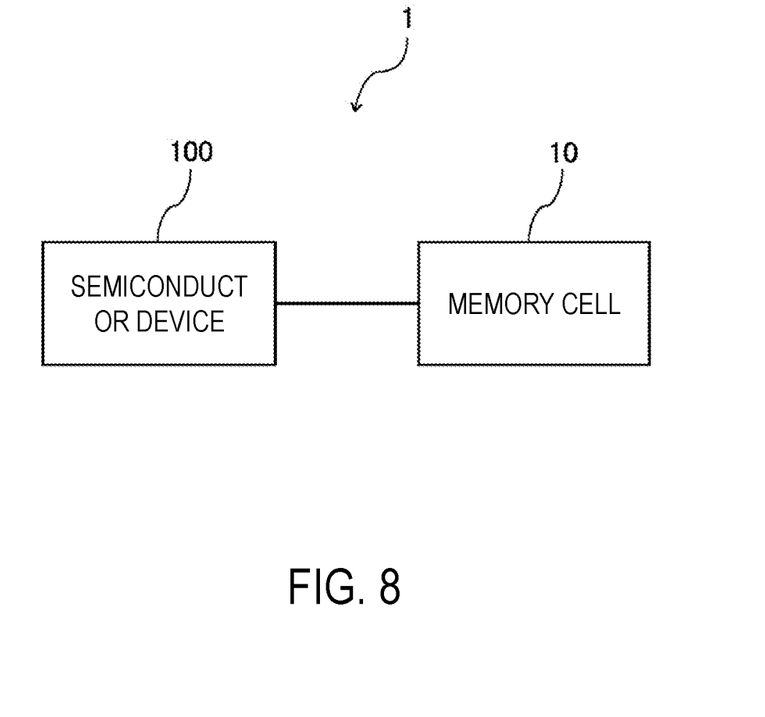
FIG. 8 is a diagram illustrating an example of a semiconductor memory device including the semiconductor device according to the embodiment.

A semiconductor memory device including the semiconductor device according to the embodiment will be described below. FIG. 8 is a diagram illustrating an example of a semiconductor memory device 1 including the semiconductor device 100 according to the embodiment.

The semiconductor memory device 1 illustrated in FIG. 8 includes a semiconductor device 100 and a memory cell 10 that is electrically connected to the semiconductor device 100. The semiconductor device 100 supplies, for example, a plate line voltage or a bit line precharging voltage of the memory cell 10 through the VCP node. With the semiconductor memory device 1, since the output voltage VCP from the semiconductor device 100 is stably supplied, the memory cell 10 operates more stably in comparison with a case in which the transistor according to the comparative example illustrated in FIG. 4 is provided in the drivers 105 and 106.

According to the embodiment, as described above, it is possible to provide a semiconductor device 100 that can step down a voltage to a desired voltage and a semiconductor memory device 1 including the semiconductor device 100.

What is claimed is:

1. A semiconductor device, wherein at least one of a first transistor and a second transistor that supply a second voltage in a step-down circuit stepping down a first voltage to the second voltage and outputting the second voltage from an output portion is provided such that a number of second contacts of a source electrode which is connected to a ground voltage or is supplied with the first voltage is larger than a number of first contacts connecting a diffusion layer and a first metal layer of a drain electrode connected to the output portion, and a number of second vias of the source electrode connected to the ground voltage or supplied with the first voltage is larger than a number of first vias connecting the first metal layer and a second metal layer of the drain electrode connected to the output portion.

2. The semiconductor device according to claim 1, wherein a polysilicon layer of a gate electrode which is divided by a plurality of the source electrodes and a plurality of the drain electrodes and which is supplied with a third voltage generated by feeding back a voltage of the output portion and comparing the voltage of the output portion with a reference voltage to supply the second voltage surrounds the diffusion layer of the drain electrode or the source electrode.

3. The semiconductor device according to claim 1, wherein a second metal layer of the source electrode connected to the ground voltage or supplied with the first voltage and the second metal layer of the drain electrode connected to the output portion are wired in a gate length direction over the diffusion layer, and
wherein interconnections of the second metal layer of the source electrode pass between interconnections of the second metal layer of the drain electrode.

4. The semiconductor device according to claim 1, wherein a second metal layer of the source electrode connected to the ground voltage or supplied with the first voltage is wired in a gate length direction over the diffusion layer of the first transistor or the second transistor connected to the output portion, and
wherein the second metal layer of the drain electrode connected to the output portion is wired in the gate length direction outside of the diffusion layer of the first transistor or the second transistor.

5. The semiconductor device according to claim 1, wherein the number of second contacts is equal to or greater than two times the number of first contacts, and
wherein the number of second vias is equal to or greater than two times the number of first vias.

6. The semiconductor device according to claim 2, wherein the number of second contacts is equal to or greater than two times the number of first contacts, and
wherein the number of second vias is equal to or greater than two times the number of first vias.

7. The semiconductor device according to claim 3, wherein the number of second contacts is equal to or greater than two times the number of first contacts, and
wherein the number of second vias is equal to or greater than two times the number of first vias.

8. The semiconductor device according to claim 4, wherein the number of second contacts is equal to or greater than two times the number of first contacts, and
wherein the number of second vias is equal to or greater than two times the number of first vias.

9. A semiconductor memory device comprising:
the semiconductor device according to claim 1; and
a memory cell that is electrically connected to the semiconductor device.

10. A semiconductor memory device comprising:
the semiconductor device according to claim 2; and
a memory cell that is electrically connected to the semiconductor device.

11. A semiconductor memory device comprising:
the semiconductor device according to claim 3; and
a memory cell that is electrically connected to the semiconductor device.

12. A semiconductor memory device comprising:
the semiconductor device according to claim 4; and
a memory cell that is electrically connected to the semiconductor device.

13. A semiconductor memory device comprising:
the semiconductor device according to claim 5; and
a memory cell that is electrically connected to the semiconductor device.

14. A semiconductor memory device comprising:
the semiconductor device according to claim 6; and
a memory cell that is electrically connected to the semiconductor device.

15. A semiconductor memory device comprising:
the semiconductor device according to claim 7; and
a memory cell that is electrically connected to the semiconductor device.

16. A semiconductor memory device comprising:
the semiconductor device according to claim 8; and
a memory cell that is electrically connected to the semiconductor device.

* * * * *